United States Patent
Oda et al.

(10) Patent No.: US 6,816,312 B2
(45) Date of Patent: Nov. 9, 2004

(54) LENTICULAR LENS SHEET INCLUDING LIGHT-SHIELDING LAYER AND PROCESS OF PRODUCING THE SAME

(75) Inventors: Kumpei Oda, Shinjuku-Ku (JP); Masashi Nishiyama, Shinjuku-Ku (JP); Shinichi Handa, Shinjuku-Ku (JP); Yoshiyuki Yamashita, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/468,789

(22) PCT Filed: Feb. 27, 2002

(86) PCT No.: PCT/JP02/01815
§ 371 (c)(1),
(2), (4) Date: Aug. 22, 2003

(87) PCT Pub. No.: WO02/069036
PCT Pub. Date: Sep. 6, 2002

(65) Prior Publication Data
US 2004/0070837 A1 Apr. 15, 2004

(30) Foreign Application Priority Data
Feb. 28, 2001 (JP) ........................................ 2001-053935

(51) Int. Cl.[7] ........................ G02B 27/10; G03B 21/60; H01L 31/0232
(52) U.S. Cl. ........................ 359/620; 359/619; 359/621; 359/622; 359/455; 359/456; 359/626; 257/432; 257/435
(58) Field of Search .................. 359/619–622, 359/626, 454–456; 257/432, 435, 232

(56) References Cited

U.S. PATENT DOCUMENTS 6,754,005 B2 * 6/2004 Goto et al. .................. 359/456
2002/0149846 A1 * 10/2002 Goto et al. .................. 359/456

FOREIGN PATENT DOCUMENTS

| JP | 50-10134 | 2/1975 |
| JP | 50-75036 | 6/1975 |
| JP | 58-1462343 | 10/1983 |
| JP | 8-271727 | 10/1996 |
| JP | 10-039769 | 2/1998 |
| JP | 2000-147215 | 5/2000 |
| JP | 2001-074918 | 3/2001 |
| JP | 2001-116917 | 4/2001 |

* cited by examiner

Primary Examiner—Georgia Epps
Assistant Examiner—Jack Dinh
(74) Attorney, Agent, or Firm—Parkhurst & Wendel, L.L.P.

(57) ABSTRACT

A lenticular lens sheet having (1) a light-transmitting lens sheet body with a lenticular lens group formed of multiple lenticular lenses placed on a surface of the body and a silver salt emulsion light-shielding layer laminated to the other surface of the light-transmitting lens sheet body. Light-transmitting areas in the light-shielding layer correspond to light-converging parts of the lenticular lenses on the body. The positions of the light-shielding areas correspond to non-light-converging parts of the lenticular lenses. The light-shielding characteristics result from the darkened silver dispersed in the silver salt emulsion. A method for making the lenticular lens sheet is disclosed also.

21 Claims, 4 Drawing Sheets

LENTICULAR LENS SHEET INCLUDING LIGHT-SHIELDING LAYER AND PROCESS OF PRODUCING THE SAME

TECHNICAL FIELD

The present invention relates to a lenticular lens sheet for use in a rear projection screen. More particularly, it relates to a lenticular lens sheet including on its light-emerging surface side a light-shielding layer, and to a process of producing the same.

BACKGROUND ART

A so-called projection-type television, which an image is projected from the rear and the projected image is viewed from the front, is known as a large-screen television. Such a projection-type television includes an imaging light source and a rear projection screen for displaying thereon an image projected from the imaging light source. Currently used for the imaging light source are CRT's (cathode-ray tubes) for projection, characterized by higher luminance than that of ordinary CRT's, as well as liquid crystal display (LCD) projectors, digital light processing (DLP) projectors using digital micro-mirror devices (DMD's), and the like.

FIG. 7 is a view showing an example of a rear projection screen for use in a projection-type television. As shown in this figure, a rear projection screen 10 is composed of a Fresnel lens sheet (Fresnel convex lens) 11 and a lenticular lens sheet 12, where an image projected from an imaging light source (not shown in the figure) located at the rear of the rear projection screen 10 (upside in the figure) is viewed by a viewer who is in front of the rear projection screen 10 (downside in the figure). In the rear projection screen 10 shown in FIG. 7, when light 20 emitted by the imaging light source (not shown in the figure) located at the rear of the rear projection screen 10 (upside in the figure), the rays of the light 20 spreading to a certain extent, enters the rear projection screen 10, this incident light 20 is converged by the Fresnel lens sheet 11 to become, for example, parallel rays 21. These parallel rays 21 are converged by lenticular lenses 13 that are provided on the lenticular lens sheet 12 on its light-entering surface side, and go out as emergent light 22 from the light-emerging surface side of the lenticular lens sheet 12 at an angle in the range θ. This angle range θ is the range in which the projected image is visible.

As shown in FIG. 7, the lenticular lens sheet 12 for use in such a rear projection screen 10 contains, on its light-emerging surface side, a light-shielding layer 14 in order to prevent reflection of extraneous light (light that enters from the downside in FIG. 7) to improve image contrast. The light-shielding layer 14 has light-shielding areas (black stripes) 14a that correspond to the non-light-converging parts of the lenticular lenses 13. The light-shielding areas 14a in the light-shielding layer 14 can be created by coating, with a material capable of shielding light, those parts with a certain width of the light-emerging surface of the lenticular lens sheet 12 that correspond to the non-light-converging parts of the lenticular lenses 13.

It is necessary to create the light-shielding areas 14a in the light-shielding layer 14 as large as possible in such positions that the incident light 20 projected from the rear does not go out, with high positional accuracy relative to the lenticular lenses 13 having the function of converging the incident light 20. There is therefore a heavy demand for a method of accurately creating the light-shielding areas 14a in the light-shielding layer 14.

In recent years, an LCD or DLP projector, or the like has come to be used, instead of a CRT, in a projection-type television as an imaging light source. An image projected from such a light source is composed of dot matrixes and has sharper definition. For this reason, a so-called fine-pitch lenticular lens sheet 12 with a lens pitch smaller than that required for the magnifying projection of an image on a CRT has come to be demanded. Specifically, as long as a CRT is used, it is enough for the lenticular lenses to have a pitch between 0.5 mm and 2.0 mm, but when an LCD or DLP projector, or the like is used, the lenticular lenses are required to have a fine pitch between 0.05 mm and 0.3 mm.

The method described in Japanese Laid-Open Patent Publication No. 120102/1997, for example, has been known as a method of creating light-shielding areas 14a in a light-shielding layer 14 that is used in a fine-pitch lenticular lens sheet 12 of the above-described type. In this method, an ionizing-radiation-curing resin layer is formed on the flat surface of a lenticular lens sheet opposite to the lens-provided surface (the surface on which lenticular lenses are formed), and ultraviolet light is applied to the lenticular lens sheet from the lens-provided surface side to expose the ionizing-radiation-curing resin layer, thereby curing those parts of the resin layer that are in the positions corresponding to the light-converging parts of the lenticular lenses. Making use of the stickiness of the surfaces of those parts of the resin layer other than the cured parts, a toner or transfer ink layer (black in color) is adhered to the surfaces of those parts of the resin layer that are in the positions corresponding to the non-light-converging parts of the lenticular lenses. A light-shielding layer having therein a predetermined light-shielding pattern is thus formed on the lenticular lens sheet on its light-emerging surface side.

However, the lenticular lens sheet produced by the method described in the above publication is at a disadvantage in that the light-shielding pattern in the light-shielding layer is poor in positional accuracy. Another drawback is as follows: the light-shielding effect of the light-shielding layer is insufficient, so that when this lenticular lens sheet is combined with a light-converging lens means such as a Fresnel lens sheet to make a rear projection screen, sufficiently high optical efficiency cannot be obtained, and, in addition, it is highly possible that high image contrast cannot be obtained.

Further, in the method described in the above publication, the process of creating the light-shielding areas requires the step of forming an ionizing-radiation-curing resin layer; the step of curing, by exposure, those parts of the resin layer that are in the positions corresponding to the light-converging parts of the lenticular lenses, leaving the surfaces of the other parts of the resin layer sticky; the step of adhering a toner or transfer ink layer to the non-light-converging parts; and so forth. This method thus requires a large number of steps, so that it is poor in efficiency.

DISCLOSURE OF THE INVENTION

The present invention was accomplished in the light of the aforementioned drawbacks in the background art. An object of the present invention is therefore to provide a lenticular lens sheet that comprises a light-shielding layer having a light-shielding pattern formed with high positional accuracy and that ensures sufficiently high image contrast even when it is combined with a light-converging lens means such as a Fresnel lens sheet to make a rear projection screen, and a process of producing such a lenticular lens sheet.

Another object of the present invention is to provide a lenticular lens sheet for use in a rear projection screen, that comprises a light-shielding layer and that can be produced with higher efficiency, and a process of producing such a lenticular lens sheet.

The main feature of the present invention is that: the light-shielding layer that is formed on the lenticular lens sheet on its light-emerging surface side is made from a silver salt emulsion (a silver salt photosensitive material) which is widely used in the fields of photography and medical service. With the use of a silver salt photosensitive film or the like, a silver salt emulsion layer is laminated to the light-emerging surface of the lenticular lens sheet opposite to its lens-provided surface (the surface on which lenticular lenses are formed). Exposure light is applied to the lenticular lens sheet from its lens-provided surface side to expose the silver salt emulsion layer, and development is then conducted to darken the unexposed parts of the silver salt emulsion layer, whereby a light-shielding layer with a predetermined light-shielding pattern is formed on the lenticular lens sheet on its light-emerging surface side. It is thus possible to obtain the light-shielding pattern of the light-shielding layer with high positional accuracy. Further, it is possible to vary the degree of darkening of the uncured parts according to the rate of exposure of the silver salt emulsion layer or to the degree of development. Therefore, if the optical transmission density of the light-shielding areas in the light-shielding layer is made especially high, there can be obtained a lenticular lens sheet for use in a rear projection screen, having low reflectance for extraneous light, that is, capable of attaining high image contrast.

Specifically, the present invention provides, as a first aspect, a lenticular lens sheet comprising: a light-transmitting lens sheet body having a lenticular lens group consisting of multiple lenticular lenses arranged on one surface; and a light-shielding layer made from a silver salt emulsion, laminated to the other surface of the lenticular lens sheet body; wherein the light-shielding layer has light-transmitting areas in the positions corresponding to the light-converging parts of the lenticular lenses on the lens sheet body, and light-shielding areas that are in the positions corresponding to the non-light-converging parts of the lenticular lenses and that have light-shielding characteristics owing to the darkened silver dispersed in the silver salt emulsion.

In the first aspect of the present invention, the light-shielding areas in the light-shielding layer have an optical transmission density of preferably 2 or more, more preferably 3 or more.

Further, in the first aspect of the present invention, the lens sheet body is preferably a transparent, single-layer sheet with the lenticular lens group integrally shaped.

In the first aspect of the present invention, it is also preferable that the lens sheet body includes a transparent film, and a lenticular lens layer with the lenticular lens group shaped, the lenticular lens layer being laminated to the transparent film.

In the first aspect of the present invention, it is also preferable that the light-shielding layer be laminated to the surface of the lens sheet body opposite to the surface having the lenticular lens group, with a transparent film different from the lens sheet body being disposed between the lens sheet body and the light-shielding layer. The transparent film, to which the light-shielding layer is laminated, may be laminated to the surface of the lens sheet body opposite to the surface having the lenticular lens group with the use of an adhesive agent layer.

In the first aspect of the present invention, it is also preferable that the lenticular lens sheet further comprises a plate-like supporting member capable of transmitting light, the supporting member being laminated to the lens sheet body on the lenticular lens group side or the light-shielding layer side.

In addition, in the first aspect of the present invention, it is preferable that the outermost surface of the lenticular lens sheet on the light-shielding layer side has a reflectance of not more than 10%. Further, it is preferable that the light-shielding areas in the light-shielding layer have, for light of 700 nm, a spectral reflectance 90 to 110% of that for light of 400 nm.

The present invention provides, as a second aspect, a process of producing a lenticular lens sheet, comprising the steps of: preparing a light-transmitting lens sheet body having a lenticular lens group consisting of multiple lenticular lenses arranged on one surface; laminating a silver salt emulsion layer to the other surface of the lenticular lens sheet body; applying exposure light to the lens sheet body from the lenticular lens group side to expose those parts of the silver salt emulsion layer that correspond to the light-converging parts of the lenticular lenses; and developing the silver salt emulsion layer to obtain a light-shielding layer having light-transmitting areas in the positions corresponding to the light-converging parts of the lenticular lenses, and light-shielding areas that are in the positions corresponding to the non-light-converging parts of the lenticular lenses and that have light-shielding characteristics owing to the darkened silver dispersed in the silver salt emulsion.

In the second aspect of the present invention, the silver salt emulsion layer is developed so that the light-shielding areas in the light-shielding layer can have an optical transmission density of preferably 2 or more, more preferably 3 or more.

Further, in the second aspect of the present invention, it is preferable to prepare, for the lens sheet body, a transparent, single-layer sheet with the lenticular lens group integrally shaped.

Furthermore, in the second aspect of the present invention, the process further preferably comprises the steps of: preparing a mold roll for shaping lenticular lenses, whose periphery, serving as a mold face, is provided with grooves in the inverse shape of the lenticular lens group; winding a transparent film around the mold face of the mold roll, with an ionizing-radiation-curing resin composition between the mold face of the mold roll and the transparent film; and applying ionizing radiation to the mold roll through the transparent film to cure the ionizing-radiation-curing resin composition; whereby a sheet including a transparent film, and a lenticular lens layer with the lenticular lens group shaped, the lenticular lens layer being laminated to the transparent film, is prepared for the lens sheet body.

In the second aspect of the present invention, it is preferable that the lamination of the silver salt emulsion layer to the surface of the lens sheet body opposite to the surface having the lenticular lens group be conducted by applying a silver salt emulsion to the former surface of the lens sheet body and drying the silver salt emulsion applied.

In the second aspect of the present invention, it is also preferable that the lamination of the silver salt emulsion layer to the surface of the lens sheet body opposite to the surface having the lenticular lens group be conducted by backing a silver salt emulsion layer with a transparent film to obtain a silver salt photosensitive film and adhering this silver salt photosensitive film to the lens sheet body, with the transparent film of the photosensitive film facing the surface of the lens sheet body opposite to the surface having the lenticular lens group.

In the second aspect of the present invention, it is preferable to use parallel rays for the exposure light. It is herein preferable that the parallel rays have a parallelism of 0°. It is also preferable that the parallel rays have a parallelism of more than 0° and 10° or less. A Fresnel printer, or a system composed of a light source and a louver through which light from the source can pass can be used as an exposure system capable of applying the parallel rays.

In the first aspect of the present invention, the light-shielding layer laminated to the surface of the lens sheet body opposite to the surface having the lenticular lens group is formed from a silver salt emulsion, and the light-transmitting areas and the light-shielding areas are created by patterning the light-shielding layer, making use of the difference in the degree of darkening of silver dispersed in the silver salt emulsion. It is therefore possible to make the light-shielding pattern in the light-shielding layer with high positional accuracy. Further, the light-shielding areas in the light-shielding layer can shield light thanks to the darkened silver dispersed in the silver salt emulsion, so that the reflection of extraneous light on the front (viewing plane) side can effectively be suppressed. It is thus possible to obtain sufficiently high image contrast even when the lenticular lens sheet is combined with a light-converging lens means such as a Fresnel lens sheet to make a rear projection screen.

Further, in the first aspect of the present invention, if the optical transmission density of the light-shielding areas in the light-shielding layer is made 2 or more, the light-shielding areas can surely show the light-shielding effect. In addition, since the light-shielding areas in the light-shielding layer have low reflectance, the reflectance for extraneous light on the front (viewing plane) side can be suppressed to low.

Furthermore, in the first aspect of the present invention, if the optical transmission density of the light-shielding areas in the light-shielding layer is made 3 or more, the light-shielding areas can more surely show the light-shielding effect. In addition, since the light-shielding areas in the light-shielding layer have low reflectance, the reflectance for extraneous light on the front (viewing plane) side can be suppressed to lower.

Furthermore, in the first aspect of the present invention, if a transparent, single-layer sheet with a lenticular lens group integrally shaped is prepared for the lens sheet body, it becomes possible to simplify the structure of the lens sheet body.

Furthermore, in the first aspect of the present invention, if a transparent film, to which a lenticular lens layer having the lenticular lens group shaped is laminated, is prepared for the lens sheet body, it becomes possible to make the lens sheet body with high accuracy and efficiency.

Furthermore, in the first aspect of the present invention, since the light-shielding layer made from a silver salt emulsion may be laminated to the lens sheet body with a transparent film different from the lens sheet body being disposed between the lens sheet body and the light-shielding layer, a silver salt photosensitive film such as a conventional photographic silver salt film can be used to form the light-shielding layer.

Furthermore, in the first aspect of the present invention, since the transparent film, to which the light-shielding layer is laminated, may be laminated to the lens sheet body with the use of an adhesive agent layer, a silver salt photosensitive film such as a conventional photographic silver salt film can be used to form the light-shielding layer and can thus be readily fixed to the lens sheet body.

Furthermore, in the first aspect of the present invention, if the lenticular lens sheet further comprises a light-transmitting, plate-like supporting member laminated to the lens sheet body on its lenticular lens group side or the light-shielding layer side, it becomes self-supporting and can well maintain its shape even when it is in the standing state.

Furthermore, in the first aspect of the present invention, if the outermost surface of the lenticular lens sheet on its light-shielding layer side is made to have a reflectance of not more than 10%, the lowering of image contrast that is caused by extraneous light can be suppressed to extremely small.

Furthermore, in the first aspect of the present invention, if the light-shielding areas in the light-shielding layer are made to have, for light of 700 nm, a spectral reflectance 90 to 110% of that for light of 400 nm, they are seen black or nearly black and thus have lowered visual sensitivity. It is therefore possible to effectively prevent the lowering of image contrast that is caused by extraneous light.

According to the second aspect of the present invention, the light-shielding layer having a predetermined light-shielding pattern is formed on the lens sheet body on its light-emerging surface side in the following manner: a silver salt emulsion layer is laminated to the surface of the lens sheet body opposite to the surface having the lenticular lens group; exposure light is applied to the lens sheet body from the lenticular lens group side to expose the silver salt emulsion layer; and the silver salt emulsion layer is then developed to darken its unexposed parts. It is therefore possible to produce a lenticular lens sheet comprising the light-shielding layer with higher efficiency. It is also possible to form the light-shielding pattern in the light-shielding layer with high positional accuracy. In addition, the light-shielding areas in the light-shielding layer can shield light thanks to the darkened silver dispersed in the silver salt emulsion, so that it is possible to effectively suppress the reflection of extraneous light on the front (viewing plane) side. Sufficiently high image contrast can thus be obtained even when the lenticular lens sheet is combined with a light-converging lens means such as a Fresnel lens sheet to make a rear projection screen.

In the second aspect of the present invention, if the silver salt emulsion layer is developed so that the light-shielding areas in the light-shielding layer can have an optical transmission density of 2 or more, the light-shielding areas can surely show the light-shielding effect. In addition, since the light-shielding areas in the light-shielding layer have low reflectance, the reflectance for extraneous light on the front (viewing plane) side can be suppressed to low.

Furthermore, in the second aspect of the present invention, if the silver salt emulsion layer is developed so that the light-shielding areas in the light-shielding layer can have an optical transmission density of 3 or more, the light-shielding areas can more surely show the light-shielding effect. In addition, since the light-shielding areas in the light-shielding layer have low reflectance, the reflectance for extraneous light on the front (viewing plane) side can be suppressed to lower.

Furthermore, in the second aspect of the present invention, if a transparent, single-layer sheet with the lenticular lens group integrally shaped is prepared for the lens sheet body, it becomes possible to simplify the structure of the lens sheet body.

Furthermore, in the second aspect of the present invention, if a transparent film, to which a lenticular lens layer made from an ionizing-radiation-curing composition is laminated, is prepared for the lens sheet body by the use of a mold roll for shaping lenticular lenses, whose periphery, serving as a mold face, is provided with grooves in the inverse shape of the lenticular lens group, it becomes possible to make the lens sheet body with high accuracy and efficiency.

Furthermore, in the second aspect of the present invention, if the lamination of the silver salt emulsion layer to the lens sheet body is conducted by applying a silver salt emulsion to the lens sheet body, and drying the silver salt emulsion layer applied, it becomes possible to make the lamination structure of the finally obtained lenticular lens sheet simple.

Furthermore, in the second aspect of the present invention, if the lamination of the silver salt emulsion layer to the lens sheet body is conducted by adhering a silver salt photosensitive film prepared by backing a silver salt emulsion layer with a transparent film, it is possible to form the silver salt emulsion layer with higher accuracy.

Furthermore, in the second aspect of the present invention, if parallel rays are used for the exposure light, the light-shielding areas can be accurately created in the light-shielding layer centered on the non-light-converging parts of the lenticular lenses.

Furthermore, in the second aspect of the present invention, if the parallelism of the parallel rays is made 0°, it is possible to accurately create, in the light-shielding layer, the light-shielding areas with a preferable width.

Furthermore, in the second aspect of the present invention, if the parallelism of the parallel rays is made more than 0° and 10° or less, it is possible to create, in the light-shielding layer, the light-shielding areas with the desired width.

Furthermore, in the second aspect of the present invention, if a Fresnel printer is used as an exposure system capable of applying the parallel rays, it is possible to maintain the flatness of the lenticular lens sheet during exposure and thus to attain improved exposure accuracy.

Furthermore, in the second aspect of the present invention, if a system composed of a light source and a louver through which light from the light source can pass is used as an exposure system capable of applying the parallel rays, it is possible to conduct exposure while easily controlling the parallelism of the parallel rays.

BEST MODE FOR CARRYING OUT THE INVENTION

By referring to the accompanying drawings, embodiments of the present invention will be described hereinafter.

Figure 1:
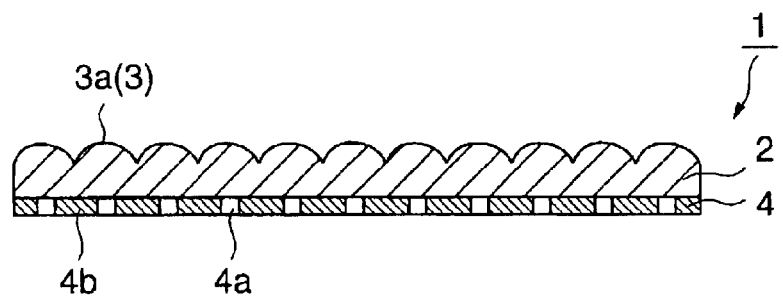
FIG. 1 is a cross-sectional view showing an embodiment of the lenticular lens sheet according to the present invention.

FIG. 1 is a cross-sectional view showing a lenticular lens sheet 1 according to an embodiment of the present invention. As shown in this figure, the lenticular lens sheet 1 contains a light-transmitting lens sheet body 2 having a lenticular lens group 3 consisting of multiple lenticular lenses 3a arranged on its upper surface.

To the lower surface of the lens sheet body 2 taking the above-described structure is laminated a light-shielding layer 4 made from a silver salt emulsion in which a silver salt is dispersed in an emulsion (silver salt photosensitive material). The light-shielding layer 4 has light-transmitting areas 4a in the positions corresponding to the light-converging parts of the lenticular lenses 3a on the lens sheet body 2, and light-shielding areas 4b that are in the positions corresponding to the non-light-converging parts of the lenticular lenses 3a (the areas between the light-transmitting areas 4a) and that have light-shielding characteristics owing to the darkened silver dispersed in the silver salt emulsion. The light-shielding areas 4b in the light-shielding layer 4 have an optical transmission density of preferably 2 or more, more preferably 3 or more. Both the light-transmitting areas 4a and the light-shielding areas 4b in the light-shielding layer 4 are created by exposing and developing the silver salt emulsion layer, as will be described later.

Figure 2A:
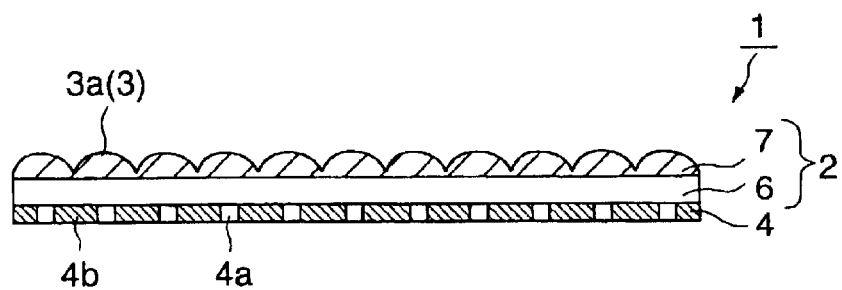
FIGS. 2A and 2B are cross-sectional views showing modifications of the lenticular lens sheet shown in FIG. 1.

The lens sheet body 2 in the lenticular lens sheet 1 shown in FIG. 1 is a transparent, single-layer sheet with the lenticular lens group 3 integrally shaped. However, the lenticular lens sheet of the present invention is not limited to this, and the lens sheet body 2 may be made by laminating, to a transparent film 6, a lenticular lens layer 7 having a lenticular lens group 3 consisting of multiple lenticular lenses 3a arranged, as shown in FIG. 2A. To the lower surface of the lens sheet body 2 of the lenticular lens sheet 1 shown in FIG. 2A, a light-shielding layer 4 having light-transmitting areas 4a and light-shielding areas 4b is laminated as in the lenticular lens sheet 1 shown in FIG. 1.

Figure 2B:
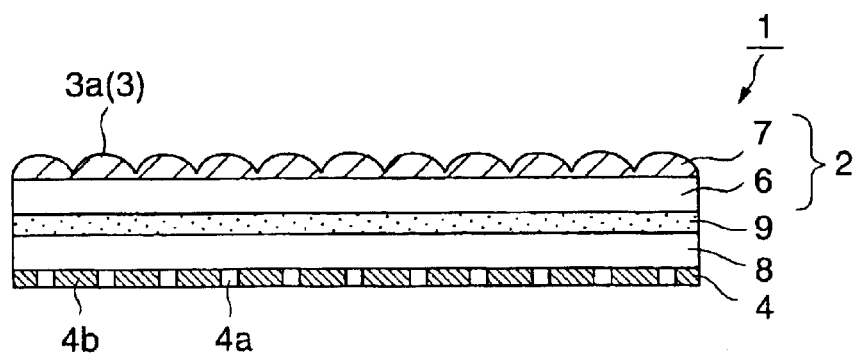

In the lenticular lens sheet 1 shown in FIG. 2A, the light-shielding layer 4 is directly laminated to the lower surface of the lens sheet body 2. However, the lenticular lens sheet of the present invention is not limited to this, and the light-shielding layer 4 may also be laminated to the lens sheet body 2, with a transparent film 8 different from the transparent film 6 of the lens sheet body 2 being disposed therebetween, as shown in FIG. 2B. In this method, a silver salt emulsion layer, which it is not easy to uniformly form by coating, can be formed beforehand, by coating, on the transparent film 8 having no irregularities, so that it is possible to form a silver salt emulsion layer with higher accuracy. The transparent films 6 and 8 are herein fixed to each other with the use of an adhesive agent layer 9, as shown in FIG. 2B, or with a mechanical means. The structure of the lenticular lens sheet 1 shown in FIG. 2B can readily be attained by the use of a silver salt photosensitive film, such as a conventional photographic silver salt film, produced by laminating a silver salt emulsion layer to a transparent film. When using a conventional photographic silver salt film, it is desirable to remove an antihalation layer, which is often provided on the back surface of the silver salt film.

The structure of the lenticular lens sheet 1 shown in FIG. 2B (in which the light-shielding layer 4 is laminated to the lens sheet body 2, with the transparent film 8 (and the adhesive agent layer 9, if necessary) being disposed therebetween) is also applicable to the lenticular lens sheet 1 shown in FIG. 1.

The lenticular lens sheet 1 shown in FIG. 1, 2A or 2B is in the form of an extremely thin film, so that it is not self-supporting and cannot well maintain its shape when it is in the standing state.

Figures 3A, 3B:
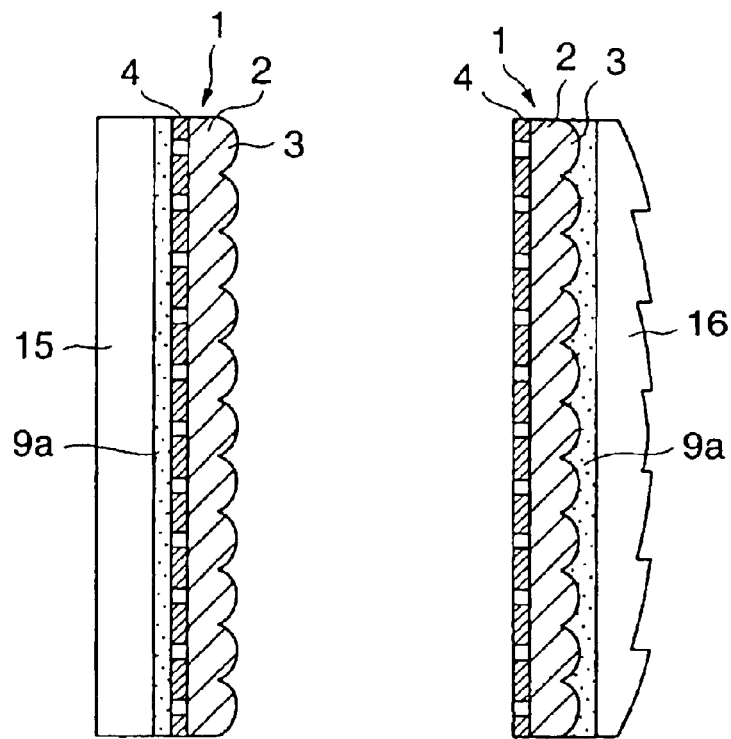
FIGS. 3A and 3B are cross-sectional views showing other embodiments of the lenticular lens sheet according to the present invention.

It is therefore preferable to laminate a relatively-thick, self-supporting, light-transmitting sheet or plate (plate-like supporting member) 15 to the lens sheet body 2 on its light-shielding layer 4 side, preferably with the use of a transparent adhesive agent layer 9a, as shown in FIG. 3A. For the sheet or plate 15, a light-diffusing one can be used. Alternatively, a sheet or plate 15 having, on one surface, a light-diffusing layer laminated, may be used.

A Fresnel lens sheet (Fresnel convex lens) 16, which is a light-converging lens means often used in combination with a lenticular lens sheet 1, may also be used as the plate-like supporting member. In this case, the Fresnel lens sheet 16 is laminated to the lens sheet body 2 on its lenticular lens group 3 side, preferably with the use of a transparent adhesive agent layer 9a, as shown in FIG. 3B.

Although not shown in the figure, the following structure is also acceptable: a Fresnel lens sheet (Fresnel convex lens) a light-converging lens means, is laminated to the lens sheet body 2 on its lenticular lens group 3 side, as shown in FIG. 3B, while a light-transmitting sheet or plate is laminated to the lens sheet body 2 on its light-shielding layer 4 side opposite to the lenticular lens group 3 side, as shown in FIG. 3A. For this sheet or plate, a light-diffusing one, or a sheet or plate having, on one surface, a light-diffusing layer laminated, can be used as in the lenticular lens sheet shown in FIG. 3A.

In the lenticular lens sheet 1 shown in FIG. 1, 2A or 2B, the surface on the light-shielding layer 4 side is the viewing plane and is to face to a viewer. It is preferable that this viewing plane has extremely low reflectance for extraneous light. Specifically, it is preferable that the outermost surface of the lenticular lens sheet 1 on its light-shielding layer 4 side has a reflectance of not more than 10%. In the case where a light-transmitting sheet or plate 15 is laminated to the lenticular lens sheet 1 on its light-emerging surface side, as shown in FIG. 3A, it is preferable that the exposed surface of the sheet or plate 15 has a reflectance of not more than 10%.

Further, it is preferable that the light-shielding areas 4b in the light-shielding layer 4 be seen black or nearly black. Depending on the type of the silver salt emulsion used, the light-shielding areas 4b, darkened areas, may be seen reddish or bluish. In the visible light range, however, it is preferable that the light-shielding areas 4b have flat or nearly flat reflection characteristics (reflectance for light versus wavelength of the light). Furthermore, according to the results of our studies, it is preferable that the light-shielding areas 4b have a spectral reflectance, for light of 700 nm, 90 to 110% of that for light of 400 nm. This is because, when this percentage is less than 90%, the light-shielding areas 4b are seen slightly bluish, while when it is more than 110%, they are seen slightly reddish. However, it has been known from our experiences that the reflectance of bluish light-shielding areas 4b is perceived lower than that of reddish ones. It is therefore considered that the acceptable range is wider when the above percentage is less than 90% than when the percentage is in excess of 110%.

Preferably, the width of the light-shielding areas 4b in the light-shielding layer 4 is in the order of 0.3 p to 0.9 p when the pitch p of the lenticular lenses 3a in the lenticular lens group 3 formed on the opposite side of the light-shielding layer 4 is in the order of 50 to 300 $\mu$m. The pitch of the lenticular lenses 3a and the width of the light-shielding areas 4b may be properly determined, considering the use of the lenticular lens sheet, shaping accuracy, and so forth.

Next, by referring to FIGS. 4 to 6, a process of producing the lenticular lens sheet 1 whose structure is as mentioned above will be described hereinafter.

First of all, a process of making the lens sheet body 2 of the lenticular lens sheet 1 is described with reference to FIG. 4. Taken herein as an example to describe the process is a case where the lens sheet body 2 is composed of a transparent film 6 and a lenticular lens layer 7, as shown in FIG. 2A or 2B. Incidentally, a lens sheet body 2 as shown in FIG. 1, which is a transparent, single-layer sheet with a lenticular lens group integrally shaped, can be made by a shaping method using a mold or mold roll. In general, a lens sheet body 2 as shown in FIG. 2A or 2B can be made more accurately and efficiently than a lens sheet body 2 as shown in FIG. 1.

Figure 4:
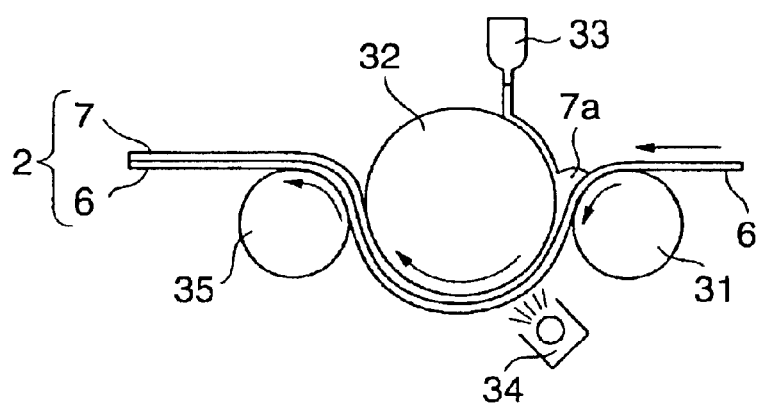
FIG. 4 is a view for illustrating an example of the process of making a lens sheet body, included in the process for producing a lenticular lens sheet according to the present invention.

As shown in FIG. 4, a transparent film 6 made of a transparent plastic film or the like which serves as a base film is unwound from the right-hand side in the figure, and is fed between a shaping roll 32 and a press roll 31 that are juxtaposed with each other. The shaping roll 32 rotates clockwise, while the press roll 31 rotates anti-clockwise.

Before the transparent film 6 gets between the shaping roll 32 and the press roll 31, an ultraviolet-curing resin composition (ionizing-radiation-curing resin composition) 7a is fed from a dispenser 33 that is located diagonally above the shaping roll 32. The ultraviolet-curing resin composition 7a, now held between the shaping roll 32 and the transparent film 6, is carried under the shaping roll 32. The shaping roll 32 is a mold roll for shaping lenticular lenses, and has, on its periphery that serves as a mold face, a large number of grooves formed in parallel, in the inverse shape of the lenticular lens group consisting of multiple lenticular lenses arranged. The shaping roll 32 is usually metallic.

An ultraviolet irradiation system 34 is located under the shaping roll 32 so that ultraviolet light can be applied upwardly to the shaping roll 32. When ultraviolet light is applied with this system, the ultraviolet-curing resin composition 7a held between the shaping roll 32 and the transparent film 6 cures, and the cured ultraviolet-curing resin composition 7a is in the inverse shape of the grooves that are provided on the mold face of the shaping roll 32. A lenticular lens layer 7 having thereon a lenticular lens group is thus formed, and there is finally obtained a lens sheet body 2 composed of the transparent film 6 and the lenticular lens layer 7 laminated to the transparent film 6.

This lens sheet body 2, being wound around the shaping roll 32, is carried to a peeling roll 35 located on the left-hand side of the shaping roll 32 in such a position that it can nip, together with the shaping roll 32, the lens sheet body 2, and is peeled from the shaping roll 32.

The similar results can be obtained even when an electron-beam-curing resin composition is used in place of the above-described ultraviolet-curing resin composition 7a, and an electron beam is applied by the use of an electron beam irradiation system instead of applying ultraviolet light with the use of an ultraviolet irradiation system.

Thereafter, a silver salt emulsion layer is laminated to the light-emerging surface (opposite to the surface having the lenticular lens group 3) of the lens sheet body 2 prepared in the above-described manner, and is successively subjected to exposure and development. A light-shielding layer 4 having light-transmitting areas 4a and light-shielding areas 4b is thus formed on the lens sheet body 2 on its light-emerging surface side.

Figure 5:
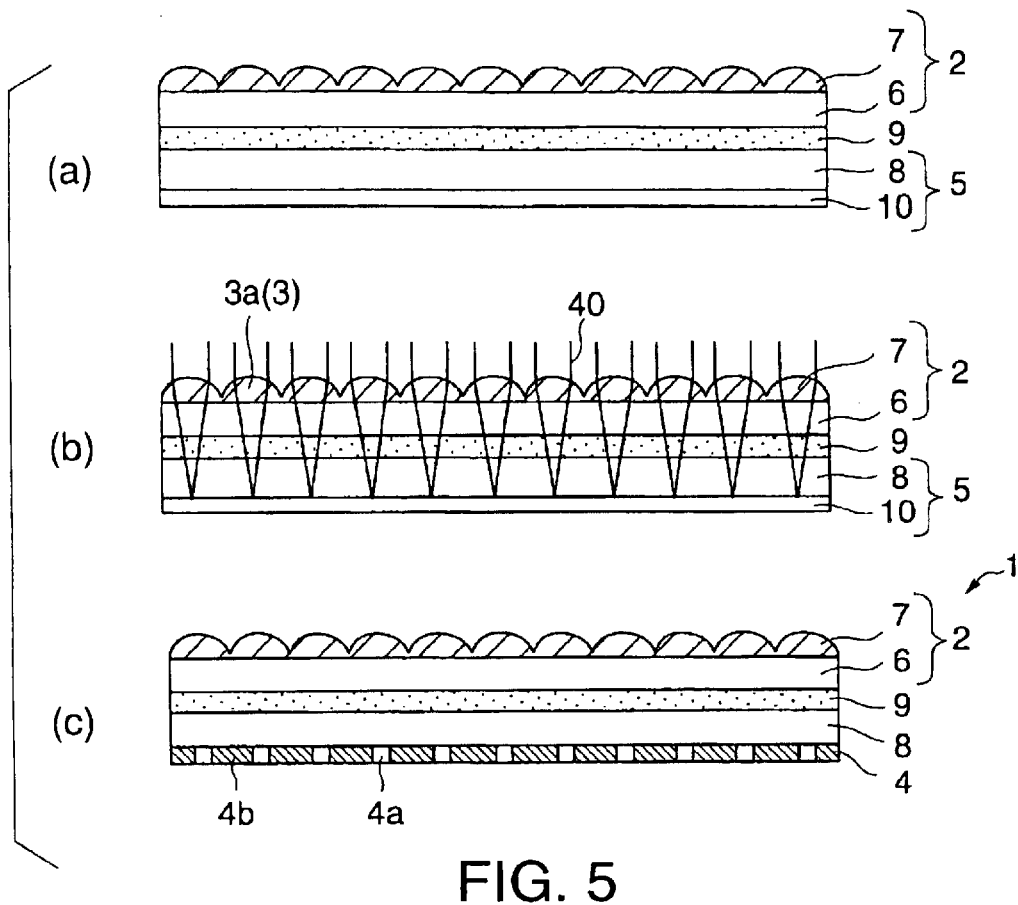
FIG. 5 is a view for illustrating the process of making a light-shielding layer to be formed on a lens sheet body on its light-emerging surface side, included in the process for producing a lenticular lens sheet according to the present invention.
Figure 6:
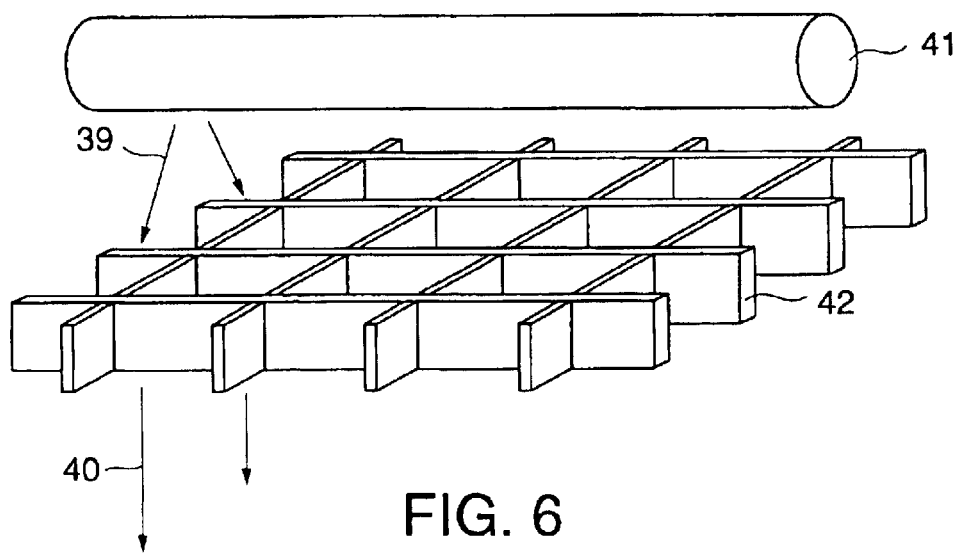
FIG. 6 is a diagrammatic perspective view showing an example of an exposure system that is used in the exposure step in the process of making a light-shielding layer shown in FIG. 5.
Figure 7:
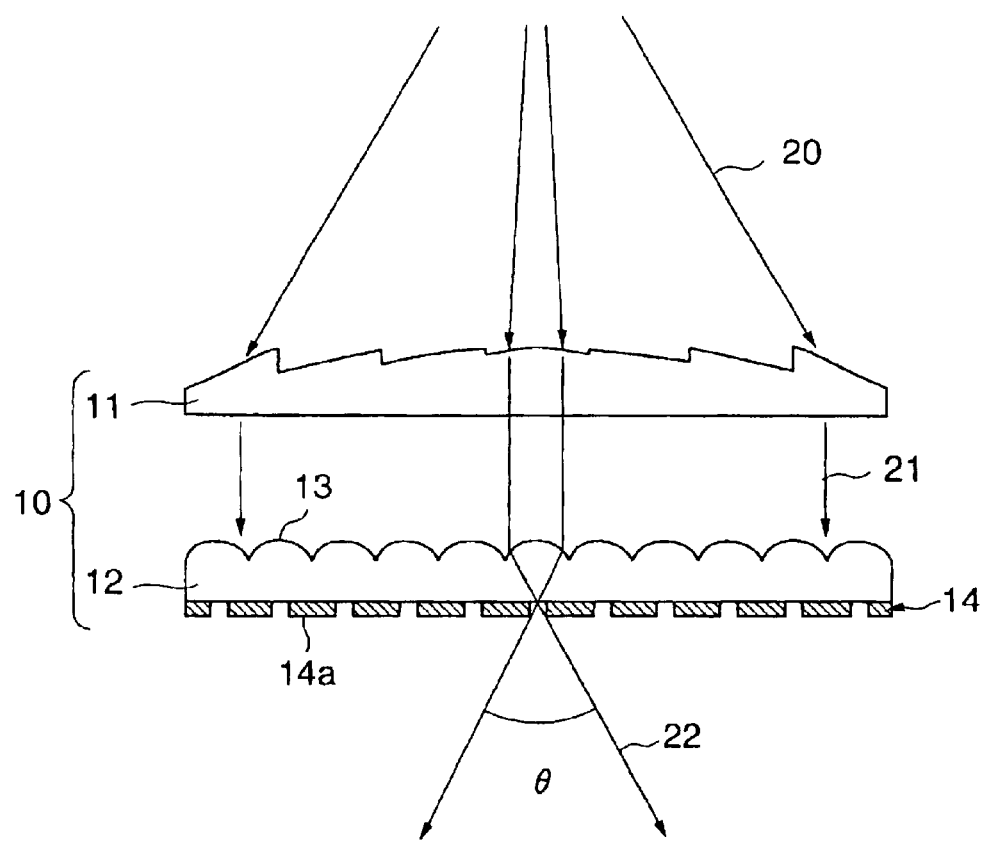
FIG. 7 is a view showing an example of a rear projection screen including a lenticular lens sheet.

FIG. 5 is a view for illustrating the process of making a light-shielding layer 4 that is formed on the lens sheet body 2 on its light-emerging surface side. Production of a lenticular lens sheet 1 whose structure is as shown in FIG. 2B is herein taken as an example to describe the process. Basically the same process can be employed to produce a lenticular lens sheet 1 whose structure is as shown in FIG. 1 or 2A.

As shown in FIG. 5(*a*), a silver salt emulsion layer 10 is firstly laminated to the above-prepared lens sheet body 2 on its light-emerging surface side. Lamination of the silver salt emulsion layer 10 to the lens sheet body 2 is herein conducted in the following manner: a silver salt photosensitive film 5 is prepared by backing a silver salt emulsion layer 10 with a transparent film 8, and is adhered to the lens sheet body 2 with the use of an adhesive agent layer 9, with the transparent film 8 of the silver salt photosensitive film 5 facing the lens sheet body 2. Alternatively, lamination of the silver salt emulsion layer 10 to the lens sheet body 2 may also be conducted in the following manner: a silver salt emulsion is applied to the light-emerging surface of the lens sheet body 2 and is then dried to form a silver salt emulsion layer 10 directly on the light-emerging surface of the lens sheet body 2. Obtainable in the latter manner is a lenticular lens sheet 1 whose structure is as shown in FIG. 1 or 2A.

Next, parallel rays (exposure light) 40 are applied to the lens sheet body 2 from the lenticular lens group 3 side (the lenticular lens layer 7 side) in the direction vertical to the lens sheet body 2. As a result, those parts of the silver salt emulsion layer 10 that correspond to the light-converging parts of the lenticular lenses 3a are exposed because the focal point of each lenticular lens 3a generally exists in the vicinity of the light-emerging surface of the lens sheet body 2.

Thereafter, the silver salt emulsion layer 10 exposed in the above-described manner is developed. Specifically, when the silver salt emulsion layer 10 is of negative type, reversal development is conducted, while when it is of positive type, development suited to the formulation of the layer is conducted. Thus, there is formed a light-shielding layer 4 having light-transmitting areas 4a in the positions corresponding to the light-converging parts of the lenticular lenses 3a and light-shielding areas 4b that are in the positions corresponding to the non-light-converging parts of the lenticular lenses 3a and that have light-shielding characteristics owing to the darkened silver dispersed in the silver salt emulsion.

In the above-described development step, the silver salt emulsion layer 10 is fully developed to such an extent that the darkened light-shielding areas 4b in the light-shielding layer 4 can have an optical transmission density of preferably 2 or more, more preferably 3 or more.

In the exposure step shown in FIG. 5(*b*), if a contact aligner is used to conduct exposure using parallel rays 40, there may be used, for example, a Fresnel printer which can make diffused light from a light source into parallel rays. The use of a Fresnel printer makes it possible to conduct exposure while keeping the lenticular lens sheet in contact with the exposure system (contact bake); the flatness of the lenticular lens sheet can thus be well maintained during exposure.

Further, to conduct exposure using parallel rays 40 with the use of a slit exposure system, a Fresnel lens capable of covering the slit width may be used as a means for making diffused light from a light source into parallel rays. Furthermore, as shown in FIG. 6, it is also possible to pass diffused light 39 from a light source 41 through a louver 42 in the form of a lattice or the like, thereby letting the diffused light go out as parallel rays 40. In the method shown in FIG. 6, the parallelism of the parallel rays 40 can be controlled by varying the size of openings in the louver 42 and the height (the dimension in the direction in which light passes) of the louver 42. Such a louver 42 can also be used in combination with the above-described contact aligner.

The lenticular lenses 3a on the lens sheet body 2 are usually designed so that their focal points come on the light-emerging surface of the lens sheet body 2. Therefore, when perfectly parallel rays are used for exposure, the exposed parts (light-transmitting areas 4a) usually have extremely small widths, and the light-shielding layer 4 thus has the light-shielding areas 4b in an increased proportion. If a lenticular lens sheet 1 including such a light-shielding layer 4 having light-shielding areas 4b in a high proportion is incorporated in a rear projection screen, the screen has, in an increased proportion, those parts that are shielded by the light-shielding areas 4b in the light-shielding layer 4, unless the imaging light source, projector, is a point light source, and it is thus highly possible that the screen becomes dark. It is possible to increase the widths of the light-shielding areas 4b in the light-shielding layer 4 by varying the conditions that are employed in the development step; however, this way of controlling the widths of the light-shielding areas 4b is usually complicated. It is therefore preferable to expose only the needed areas to prevent the light-shielding areas 4b from undergoing a great change in width depending upon development conditions.

On the other hand, the light source for use in the above-described contact exposure using a Fresnel printer or slit exposure using a louver is in the shape of neither a dot nor a line and is in a certain size even if it is small. Therefore, light from the light source has an intensity distribution over a certain range of angle owing to the size of the light source, and the light-shielding layer 4 can thus be prevented from having the light-shielding areas 4b in a proportion higher than required.

The parallel rays 40 to be used for exposure light may be perfectly parallel ones, that is, parallel rays with a parallelism of 0°. Even when the parallel rays are ideal rays with a parallelism of 0°, it is possible to vary the widths of the light-shielding areas 4b in the light-shielding layer 4 by changing the angle of light incident on the lens sheet body 2 relative to the direction of the normal. Sun light can be used as parallel rays with a parallelism of 0°.

The parallelism of the parallel rays may also be made more than 0° and 10° or less. As long as the parallelism falls in this range, it is possible to create, in the light-shielding layer 4, the light-shielding areas 4b with the desired width. The use of parallel rays with a parallelism of 3° to 7° is more preferred.

In the above-described embodiments, optional layers such as (1) a hard coating, (2) an antireflection coating, (3) an anti-glaring coating, (4) an antistatic coating, and the like may further be laminated to the surface of the lenticular lens sheet 1 on its light-shielding layer 4 side, or this surface of the lenticular lens sheet 1 may be processed so that it can have the functions of these optional layers. The above layers (1)–(4) may be laminated directly to the surface of the light-shielding layer 4 or the like. Alternatively, the lamination of the optional layers may also be conducted by coating a light-transmitting sheet or plate with the optional layers and adhering this sheet or plate to the light-shielding layer 4 or the like.

EXAMPLES

In the system shown in FIG. 4, a polyethylene terephthalate resin film with a thickness of 75 µm was used as the transparent film, and an ultraviolet-curing resin composition was fed from a dispenser and was shaped and cured to obtain a lens sheet body composed of the transparent film having, on one surface, lenticular lenses with a height of approximately 45 µm arranged densely with a pitch of 130 µm.

The following composites of two different types, Composites A and B, were prepared by the use of the lens sheet body made in the above-described manner.

(Composite A)

A positive silver salt film (Duplicating Film "DC" manufactured by Fuji Photo Film, Co. Ltd., Japan) was prepared as the silver salt photosensitive film. The non-emulsion-coated surface of this film (opposite to the surface having a silver salt emulsion layer laminated) was rubbed with cloth impregnated with an undiluted solution of a commercially available bleaching agent ("Kitchen Haiter" manufactured by Kao Corporation, Japan) to remove the antihalation layer. A transparent, pressure-sensitive adhesive was then applied at a thickness of 10 µm to the surface of the above-prepared lens sheet body opposite to the surface having the lenticular lenses. With the use of a laminator, the positive silver salt film whose antihalation layer had been removed was then adhered to the lens sheet body, with the non-emulsion-coated surface of the silver salt film facing the adhesive layer on the lens sheet body. There was thus obtained Composite A consisting of the lens sheet body and the positive silver salt film. Two sheets of Composite A were prepared.

(Composite B)

On the light-emerging surface of the above-prepared lens sheet body, a gelatin layer with a thickness of 1 µm was formed as a primer layer, followed by drying. To this primer layer, a positive silver salt photosensitive emulsion (capable of giving a silver salt emulsion layer comparable to that in the above-described positive silver salt film) was applied at a thickness of 4 µm, and was dried. There was thus obtained Composite B consisting of the lens sheet body and the silver salt emulsion layer. Two sheets of Composite B were prepared.

The above-obtained Composites A and B, two sheets of each, were subjected to exposure of two different types as described below.

(Exposure of First Type)

A parallel ray Fresnel printer ("Film FL-3R-X" available from USHIO U-TECH INC., Japan) was prepared as the contact aligner. A sheet of Composite A and a sheet of Composite B were respectively subjected to contact exposure by exposing the lenticular lens group side of each sheet. The total exposure energy was made approximately 1.2 mJ/cm².

(Exposure of Second Type)

A fluorescent tube capable of emitting ultraviolet light ("FL20SBL" manufactured by Philips Corporation) was set downwardly, and its lower part was covered with a louver whose each square opening had internal dimensions of 4 mm×4 mm and a height of 40 mm; this assembly was used as the slit exposure system. A sheet of Composite A and a sheet of Composite B were respectively subjected to slit exposure by passing them right under the slit exposure system at a rate of 3.5 mm/sec, with the lenticular lens group side facing up.

Thereafter, the above-exposed two sheets of Composite A and two sheets of Composite B were respectively developed with a developer ("ND" manufactured by Fuji Photo Film Co., Ltd., Japan) under the conditions that the solution temperature and development time were 35° C. and 30 seconds, respectively, and were immersed in water for termination. Subsequently, the sheets were subjected to fixing using a fixing solution ("NF" manufactured by Fuji Photo Film, Co., Ltd., Japan), where the solution temperature and immersion time were made 30° C. and 30 seconds, respectively. After fixing was completed, these sheets were immersed in hot water at 40° C. for 1 minute for washing, and were then dried by blowing air at 45° C. for 60 seconds.

(Results)

In the above-described manner, lenticular lens sheets whose structure was as shown in FIG. 2B were obtained from Composite A, while lenticular lens sheets whose structure was as shown in FIG. 2A, from Composite B.

In each silver salt emulsion layer in Composite A or B, formed on the light-emerging surface of the lens sheet body, light-transmitting areas were created centered on the focal points of the lenticular lenses, and light-shielding areas with a width of 110 µm were created in the positions shifted from the light-transmitting areas by ½ of the lenticular lens pitch, irrespective of the type of exposure employed.

Further, the total light transmittance of each lenticular lens sheet finally produced by the use of Composite A or B was 83% and that of each lenticular lens sheet measured on the light-shielding layer side was 8%, irrespective of the type of exposure employed. These lenticular lens sheets were thus found to have excellent properties sufficient for lenticular lens sheets for use in rear projection screens.

What is claimed is:

1. A lenticular lens sheet comprising:
    a light-transmitting lens sheet body having a lenticular lens group consisting of multiple lenticular lenses arranged on one surface; and
    a light-shielding layer made from a silver salt emulsion, laminated to the other surface of the lenticular lens sheet body;
    wherein the light-shielding layer has light-transmitting areas in positions corresponding to light-converging parts of the lenticular lenses on the lens sheet body, and light-shielding areas that are in positions corresponding to non-light-converging parts of the lenticular lenses and that have light-shielding characteristics owing to darkened silver dispersed in the silver salt emulsion; and the light-shielding areas in the light-shielding layer have, for light of 700 nm, a spectral reflectance 90 to 110% of that for light of 400 nm.

2. The lenticular lens sheet according to claim 1, wherein the light-shielding areas in the light-shielding layer have an optical transmission density of 2 or more.

3. The lenticular lens sheet according to claim 1, wherein the light-shielding areas in the light-shielding layer have an optical transmission density of 3 or more.

4. The lenticular lens sheet according to any of claims 1 to 3, wherein the lens sheet body is a transparent, single-layer sheet with the lenticular lens group integrally shaped.

5. The lenticular lens sheet according to claim 1, wherein the lens sheet body includes a transparent film, and a lenticular lens layer with the lenticular lens group shaped, the lenticular lens layer being laminated to the transparent film.

6. The lenticular lens sheet according to claim 1, wherein the light-shielding layer is laminated to the surface of the lens sheet body opposite to the surface having the lenticular lens group, with a transparent film different from the lens sheet body being disposed between the lens sheet body and the light-shielding layer.

7. The lenticular lens sheet according to claim 6, wherein the transparent film, to which the light-shielding layer is laminated, is laminated to the surface of the lens sheet body opposite to the surface having the lenticular lens group with use of an adhesive agent layer.

8. The lenticular lens sheet according to claim 1, further comprising a plate-like supporting member capable of transmitting light, the supporting member being laminated to the lens sheet body on the lenticular lens group side or the light-shielding layer side.

9. The lenticular lens sheet according to claim 1, wherein the outermost surface of the lenticular lens sheet on the light-shielding layer side has a reflection of not more than 10%.

10. A process of producing a lenticular lens sheet, comprising the steps of:

preparing a light-transmitting lens sheet body having a lenticular lens group consisting of multiple lenticular lenses arranged on one surface;

laminating a silver salt emulsion layer to the other surface of the lenticular lens sheet body;

applying exposure light to the lens sheet body from the lenticular lens group side to expose those parts of the silver salt emulsion layer that correspond to light-converging parts of the lenticular lenses; and developing the silver salt emulsion layer to obtain a light-shielding layer having light-transmitting areas in positions corresponding to the light-converging parts of the lenticular lenses, and light-shielding areas that are in positions corresponding to non-light-converging parts of the lenticular lenses and that have light-shielding characteristics owing to darkened silver dispersed in the silver salt emulsion, said light-shielding areas in the light-shielding layer having, for light of 700 nm, a spectral reflectance 90 to 110% of that for light of 400 nm.

11. The process of producing a lenticular lens sheet according to claim 10, wherein the silver salt emulsion layer is developed so that the light-shielding areas in the light-shielding layer have an optical transmission density of 2 or more.

12. The process of producing a lenticular lens sheet according to claim 10, wherein the silver salt emulsion layer is developed so that the light-shielding areas in the light-shielding layer have an optical transmission density of 3 or more.

13. The process of producing a lenticular lens sheet according to claim 10, wherein a transparent, single-layer sheet with the lenticular lens group integrally shaped is prepared for the lens sheet body.

14. The process of producing a lenticular lens sheet according to claim 10, further comprising the steps of:

preparing a mold roll for shaping lenticular lenses, whose periphery, serving as a mold face, is provided with grooves in an inverse shape of the lenticular lens group;

winding a transparent film around the mold face of the mold roll, with an ionizing-radiation-curing resin composition between the mold face of the mold roll and the transparent film; and applying ionizing radiation to the mold roll through the transparent film to cure the ionizing-radiation-curing resin composition;

whereby a sheet including a transparent film, and a lenticular lens layer with the lenticular lens group shaped, the lenticular lens layer being laminated to the transparent film, is prepared for the lens sheet body.

15. The process of producing a lenticular lens sheet according to claim 10, wherein the lamination of the silver salt emulsion layer to the surface of the lens sheet body opposite to the surface having the lenticular lens group is conducted by applying a silver salt emulsion to the former surface of the lens sheet body and drying the silver salt emulsion applied.

16. The process of producing a lenticular lens sheet according to claim 10, where in the lamination of the silver salt emulsion layer to the surface of the lens sheet body opposite to the surface having the lenticular lens group is conducted by backing a silver salt emulsion layer with a transparent film to obtain a silver salt photosensitive film and adhering this silver salt photosensitive film to the lens sheet body, with the transparent film of the silver salt photosensitive film facing the surface of the lens sheet body opposite to the surface having the lenticular lens group.

17. The process of producing a lenticular lens sheet according to claim 10, wherein parallel rays are used for the exposure light.

18. The process of producing a lenticular lens sheet according to claim 17, wherein the parallel rays have a parallelism of 0°.

19. The process of producing a lenticular lens sheet according to claim 17, wherein the parallel rays have a parallelism of more than 0° and 10° or less.

20. The process of producing a lenticular lens sheet according to claim 17, wherein a Fresnel printer is used as an exposure system capable of applying the parallel rays.

21. The process of producing a lenticular lens sheet according to claim 17, wherein a system composed of a light source and a louver through which light from the light source can pass is used as an exposure system capable of applying the parallel rays.

* * * * *